L. G. COPEMAN.
ELECTROTHERMOSTATIC HEAT REGULATOR.
APPLICATION FILED OCT. 1, 1908.
932,966.
Patented Aug. 31, 1909.
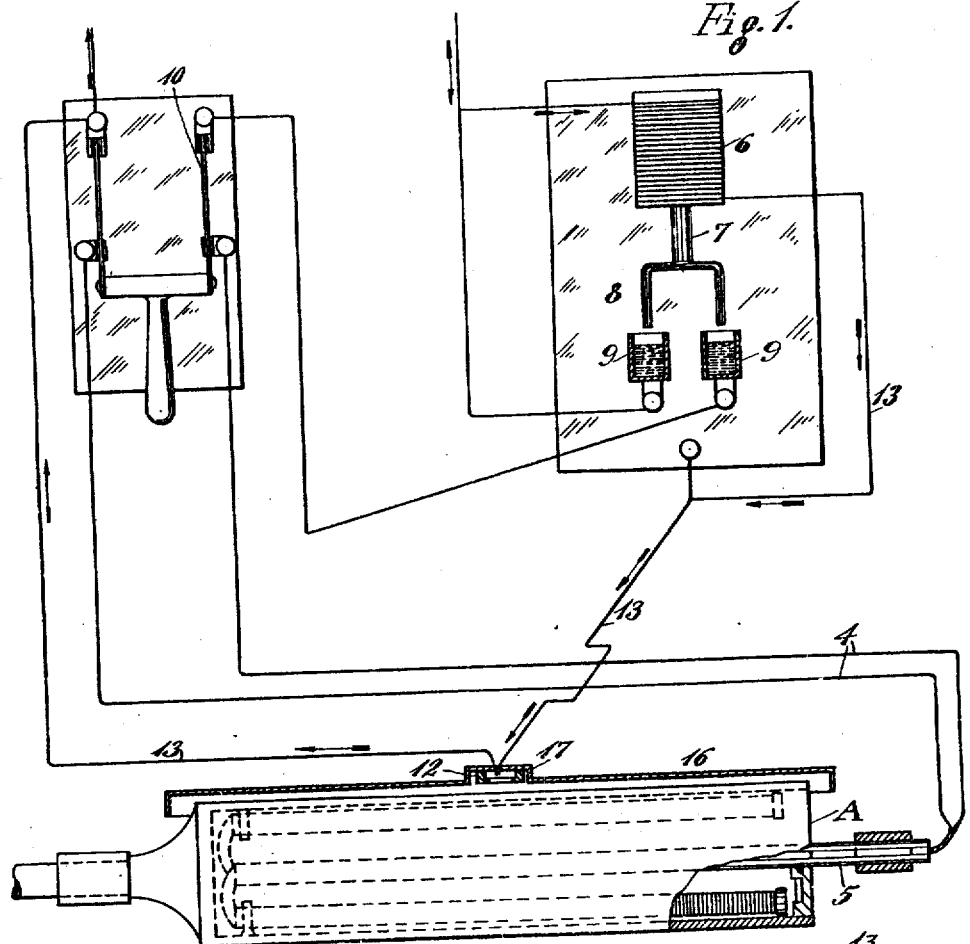
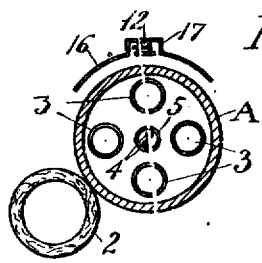
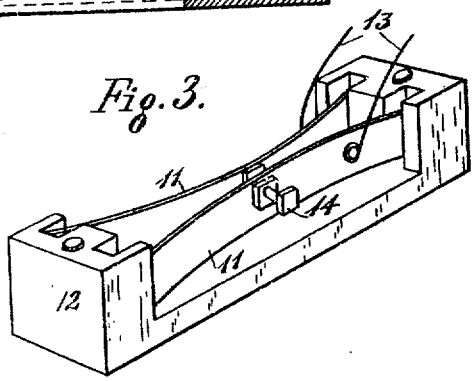
WITNESSES
INVENTOR
LLOYD G. COPEMAN.
BY Geo. H. Strong
ATTORNEY

UNITED STATES PATENT OFFICE.

LLOYD GROFF COPEMAN, OF BERKELEY, CALIFORNIA.

ELECTROTHERMOSTATIC HEAT-REGULATOR.

932,966.     Specification of Letters Patent.     Patented Aug. 31, 1909.

Application filed October 1, 1908. Serial No. 455,751.

*To all whom it may concern:*

Be it known that I, LLOYD G. COPEMAN, citizen of the United States, residing at Berkeley, in the county of Alameda and State of California, have invented new and useful Improvements in Electrothermostatic Heat-Regulators, of which the following is a specification.

This invention relates to electro thermostatic heat regulators or circuit controllers, which may be employed in conjunction with electrically heated laundry apparatus of any character, soldering irons, and similar devices, and has for its object a means for controlling the supply of electrical energy to the heater, by means of a thermostat located within the heat zone of the part to be regulated, and out of contact therewith.

It consists in a combination of parts, and in details of construction which will be more fully explained by reference to the accompanying drawings, in which—

Figure 1 is an elevation and partial section illustrating my apparatus. Fig. 2 is a transverse section. Fig. 3 is an enlarged view of the thermostat.

In many forms of electrically heated apparatus, the part to be heated may be rotary or movable in such a manner that it is not possible to connect the controlling thermostat directly with the part.

It is the object of my invention to provide a thermostat, and means by which it can be located within the heat zone of the part to be heated, and thus be so actuated as to control the heating current through the proper connections.

I have here illustrated my invention as applied to a revolving, cylindrical, laundry polishing iron A, which illustrates the application of my invention. This cylinder is centrally journaled and revoluble, and operates in conjunction with a cylinder 2, between which and the cylinder A, the articles to be polished are passed. The cylinder A is provided with the proper resistance coils, located within it, as indicated at 3, and these coils are supplied with an electrical current through the wires 4 connecting a suitable source of electrical energy with the resistance coils. As here shown these wires are carried through the central hollow shaft 5 of the cylinder A, and the current is distributed through the resistance coils as shown in Fig. 1.

The heating circuit is controlled by an electro-magnetically operated switch, through a shunt circuit connected with the main line. This switch is here shown in the form of a solenoid 6 having a movable core or armature 7, and this has connected with it, the fork or yoke 8.

9 are mercury-containing cups, or equivalent contact with which the ends of the fork 8 may be brought into contact, and when so connected, the heating circuit will be opened through the connections, as shown at 10.

The thermostat consists of elastic plates 11, the ends of which are fixed in slots or channels, or equivalent securing means, in a holder 12, as clearly shown in Fig. 3, and insulated. These plates 11 are concaved toward each other from the ends, said ends being most widely separated, and the central portions approaching.

The conducting wires 13 have their ends connected with the plates 11, and under ordinary conditions there being no contact between the plates 11, the circuit is open, and the solenoid 6 remains deënergized. As soon as the heat rises to a point where it is desired to cut it off, the expansion of the plates 11 will cause the central portions to approach each other until they form contact at 14. This closes the circuit through the wires 13, and the solenoid 6, thus energizing the latter, and acting through its armature, it raises the yoke 8 and interrupts the circuit through the cups 9, and this acting through the mechanism 10 cuts off the heating circuit, thus preventing any further increase in the temperature of the part A. As soon as the temperature has fallen sufficiently, the contraction of the plates 11 will cause them to separate at the point 14, thus interrupting the circuit through the wires 13 and the solenoid 6, and the contacts 8 and 9 will be again completed, and the heating circuit reestablished.

In order to properly operate this device, it is necessary to locate the thermostat within the heat zone of the part A. As this part is movable, it will not be possible to connect the thermostat directly therewith, I have therefore shown the thermostat as fixed within a shield 16 which is mounted above the revolving cylinder A, and has a raised chamber or receptacle formed at 17 within which the thermostat 12 is contained. The chamber being open at the lower part, and in close proximity with the part A, the heat of the latter acts directly upon the contained thermostat, and in such a manner that the variations in temperature will be promptly transmitted to this thermostat.

Having thus described my invention, what I claim and desire to secure by Letters Patent is—

1. In an apparatus of the character described, an electrical heater, a cut-out in the main circuit, an auxiliary or shunt circuit, a thermo circuit closer interposed in the auxiliary circuit independent of and exterior to the heat zone of the heater, a stationary hood arranged proximate to the heater having a depressed chamber, and a thermostat in said chamber fixed to the inner wall thereof and exposed directly to the heat radiating from the heater.

2. In an apparatus of the character described, a movable heater provided with resistance coils, and a main electrical heating circuit connected therewith, a hood partially inclosing said heater, a thermostat fixed to the inner wall of the hood and exposed directly to the heat radiating from the heater, said thermostat being fixed with relation to the movable heater and located within the heat zone thereof, an auxiliary or shunt circuit by which the heating circuit is controlled, and connections between the thermostat and said auxiliary controller whereby the main heating circuit is opened or closed.

3. In an apparatus of the character described, an electrical heater, a main electrical circuit, an auxiliary or shunt circuit through which the main circuit is opened or closed, a thermostat located within the heat zone of the electrical heater, and a hood arranged proximate to the heater having a depressed chamber in which the thermostat is arranged so as to be exposed directly to the heat radiating therefrom.

4. In an apparatus of the character described, a revoluble cylinder, electrical resistance carried therein, a hollow shaft upon which the cylinder is mounted, a main heat circuit having conducting wires extending through the shaft and connecting with the resistance within the cylinder, a thermostat located contiguous to the cylinder and out of contact therewith, a stationary hood partially inclosing the heater and having a depressed chamber in which the thermostat is placed in such manner as to be directly exposed to the heat radiating from said heater, an auxiliary or shunt circuit, a solenoid through which said shunt circuit is connected, means for opening and closing the main circuit, said means controlled by the solenoid, and connections between the shunt circuit and the thermostat.

5. In an apparatus of the character described, a movable electrical heater with interior resistances and a main heat circuit, a hood in fixed relation with the heater, a thermostat located within the hood and the heat zone of the heater, a shunt circuit controlling the main heat circuit, and connections between the thermostat and said shunt circuit.

In testimony whereof I have hereunto set my hand in presence of two subscribing witnesses.

LLOYD GROFF COPEMAN.

Witnesses:
LLOYD E. GANDY,
CHARLES A. PENFIELD.